Figure 1:
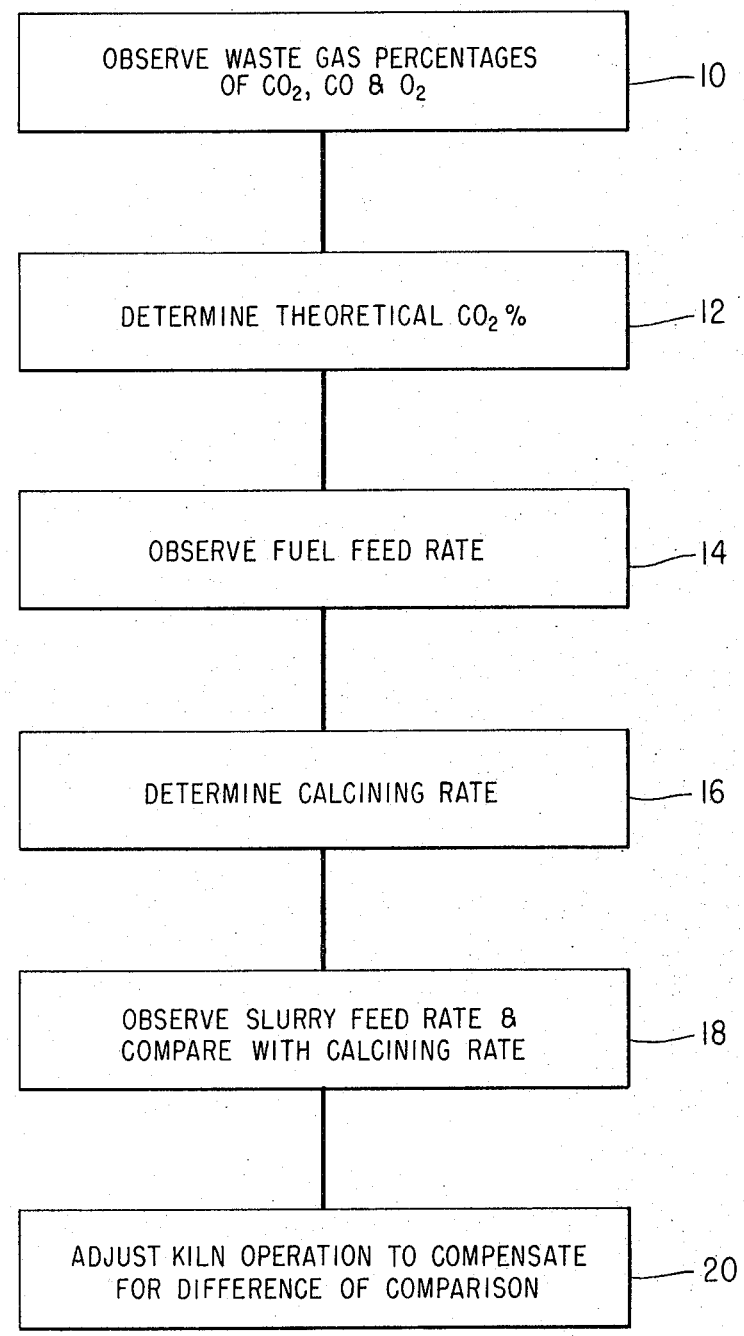

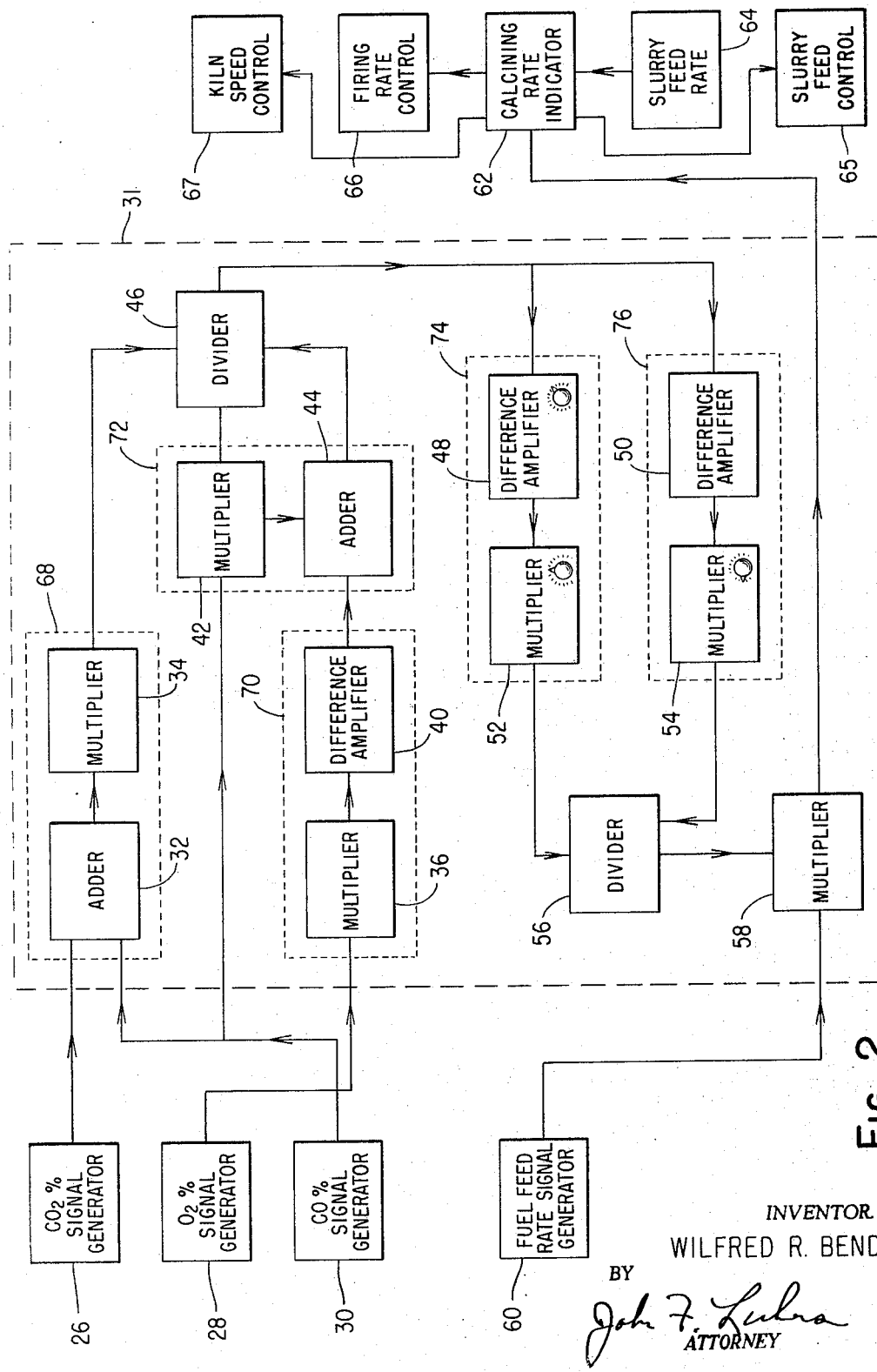

${}^{3,300,196}$
Patented Jan. 24, 1967

3,300,196
METHOD AND APPARATUS FOR ROTARY KILN CONTROL WITH A CALCINING RATE METER
Wilfred R. Bendy, St. Louis, Mo., assignor to Bendy Engineering Company, a corporation of Missouri
Filed Mar. 2, 1964, Ser. No. 348,671
23 Claims. (Cl. 263—32)

This invention relates to kiln controls, and, more particularly, to improved methods and apparatus for the control of kilns, such as lime and cement kilns, in which a calcareous material such as limestone or marl is calcined through the application of heat.

In present day cement manufacturing plants, inclined rotary kilns, having lengths of the order of 100 to 600 feet are provided to effect transformation of two or more raw materials through the application of heat. A homogeneous mixture of raw materials in the form of a dry or wet slurry is fed into the high end of the kiln and, during rotation of the kiln, passes successively through different zones commonly known as a drying zone, a preheating zone, a calcining zone, and a clinkering, or burning, zone. The transformation and union of materials within the kiln is effected by the application of heat, which in the usual arrangement is produced by a burner projecting into the kiln at the lower end and discharging combustible material, such as pulverized coal, oil or gas, and air. The rate at which fuel and air are injected is known as the "firing rate." The rate at which the slurry is fed into the kiln is known as the "feed rate."

It is important in the production of a uniform high quality product and to obtain maximum throughput and efficiency to maintain a calcining rate, which closely corresponds to the feed rate, that is the rate at which the slurry is fed into the kiln. In the calcining zone, carbon dioxide is liberated while the calcareous material is chemically changed from a carbonate to an oxide. The calcining rate reflects the degree of thermal preparation of the material just before it enters the burning, or clinkering zone. It indicates what is happening in the hidden calcining zone which is too far back from the exit of the kiln to be "seen" by a radiation pyrometer, or other type of radiation device and too far forward to have its temperature measured by a thermocouple inserted through the kiln shell. Furthermore, the calcining rate is not a measure of instantaneous temperature. Still further it is a measure of the degree of preparation of the material at a point in the kiln just before the material enters the burning zone area in which the critical exothermic reaction normally occurs.

For any given rate of fuel feed into a cement kiln, the optimum calcining rate can be mathematically determined by first determining the theoretical carbon dioxide, or that carbon dioxide which would have existed had there been neither an excess nor a deficit of combustion air; in other words, if there had been perfect combustion. This theoretical $CO_2$ can be determined from the waste gases in the kiln by the following equation:

$$\text{Theoretical } CO_2 = \frac{100 \ (CO_2 + CO)}{100 - 4.78 \ O_2 + 1.88 \ CO} \quad (1)$$

where $CO_2$, $CO$ and $O_2$ are the percent by volume of carbon dioxide, carbon monoxide and oxygen, respectively.

If the fuel consumption of a kiln (i.e., the ratio of fuel to product; for example, pounds of coal per barrel of clinker) were zero, there would be no products of combustion and the only gas present would be $CO_2$ liberated from the calcareous material and the theoretical $CO_2$ would be 100%. If, however, fuel consumption were infinitely great, the $CO_2$ liberated from the calcareous material would be negligible. Theoretical $CO_2$ would then be about 18.5% depending on the analysis of the fuel. Theoretical $CO_2$ is thus a function of the fuel consumption increasing as the fuel consumption decreases and vice versa.

After the value of theoretical $CO_2$, which will be designated C, has been determined, the calcining rate can be determined by the formula:

$$\text{Calcining rate (bbls. per hours)} = \frac{Ft(C-p)}{m(100-C)} \quad (2)$$

where C is the theoretical carbon dioxide determined by Equation 1, F is the rate of fuel feed in pounds per hour, t is cubic feet of gas resulting from perfect combustion of one pound of fuel, p is the volumetric percent of carbon dioxide and sulphur dioxide (usually considered $CO_2$) in the gases resulting from perfect combustion of the fuel, and m is equal to the cubic feet of carbon dioxide from one barrel of raw material. Thus, F and C are variable, while t, p and m are constants depending on the composition of the fuel and the raw material. Hence the calcining rate, which is an accurate index of kiln operation, may be determined.

Numerous forms of control systems and methods are known for controlling rotary cement kilns. These systems, however, are primarily concerned with the operation of the kiln on the basis of information obtained from an instantaneous temperature rather than from the total thermal preparation of the material.

I have discovered a novel method by which calcining rate may be employed accurately to control kiln operation. Further, I have discovered an improved kiln control apparatus for performing this method in which calcining rate is employed to control kiln operation.

Accordingly, it is an object of this invention to provide an improved method of kiln control.

It is another object of this invention to provide an improved apparatus for kiln control.

It is a further object of this invention to provide an improved method of kiln control based on the rate at which calcining takes place within the kiln.

It is a still further object of this invention to provide a kiln control apparatus in which measurements are made of the percentages of carbon monoxide, oxygen and carbon dioxide in the waste gases, these measurements being combined with the fuel feed rate to determine the calcining rate and in which a comparison is made between calcining rate and mixture feed rate, and employed to control kiln operation.

It is yet another object of this invention to provide a kiln control apparatus with a gas analyzer means which generates analog electrical signals in accordance with the waste gas percentages by volume of carbon monoxide, carbon dioxide and oxygen; fuel measuring means which generates an analog signal and a computer which combines these signals and delivers an output signal indicative of the calcining rate within the kiln.

Another object of this invention is to provide a kiln control apparatus with a gas analyzer means which generates electrical signals in accordance with certain of the waste gas percentages, fuel measuring means which generates an electric signal in accordance with the weight of the fuel being fed and computer means for combining these signals and for delivering an output signal indicative of the calcining rate within the kiln.

Still another object of this invention is to provide a kiln control apparatus with electrical signal generating means for generating signals in accordance with the waste gas percentages and the fuel feed rate, computer means for receiving these signals and computing the calcining rate, means for comparing the calcining rate with the raw feed rate and means for controlling a variable in kiln operation such as kiln speed or firing rate to compensate for disparities between the calcining rate and the raw feed rate.

Briefly, in accordance with aspects of this invention, I provide a novel method of kiln control in which the percentages by volume of carbon dioxide, oxygen and carbon monoxide are measured in the waste gases from the kiln. From these measurements a theoretical carbon dioxide content is computed which assumes perfect combustion of the fuel. The actual fuel feed rate is then mathematically combined with this theoretical rate of producing carbon dioxide to determine the calcining rate, or the rate at which calcining is taking place within the kiln. The calcining rate is compared with the slurry feed rate and the firing rate, kiln speed, or other kiln variable is adjusted in accordance with the disparity.

In accordance with still other aspects of this invention, I provide a novel apparatus for kiln control which automatically measures the percentages by volume of carbon dioxide, oxygen and carbon monoxide in the waste gases in the kiln and generates electrical signals which are inserted in a computer which determines the theoretical carbon dioxide percentage, which apparatus also includes means for generating an electrical signal indicative of the fuel feed rate and for inserting this signal in the computer. The computer combines the fuel feed rate and the theoretical carbon dioxide percentage and determines the calcining rate. This calcining rate may be indicated on a calcining rate indicator, or deviation recorder, which receives a signal from a slurry feed rate indicator and indicates any disparity between the two rates. Advantageously, the disparity, or deviation, may be employed automatically to control the firing rate of the kiln, speed of rotation of the kiln, slurry feed singly or in combination, or one or more of these factors may be manually controlled by an operator observing the calcining rate or deviation recorder.

These and various other objects and features of the invention will be more clearly understood from a reading of the detailed description of the invention in conjunction with the drawings which:

FIG. 1 is a block diagram of the steps employed in the novel method of kiln control according to this invention; and, FIG. 2 is a block diagram of a novel apparatus employed for kiln control according to this invention.

Referring now to FIG. 1, there is depicted, in block form, the steps of this novel method of kiln control. In utilizing this method, it is understood that suitable apparatus are provided on the kiln, on the fuel feed and slurry feed to the kiln to determine in the waste gas the percentages of carbon dioxide, carbon monoxide and oxygen, for determining the fuel feed rate, and the rate of slurry feed. In performing this method, the kiln operator performs the step indicated by block 10, namely that of observing the percentages of carbon dioxide, carbon monoxide and oxygen in the waste gas. From these observations, the operator employs Equation 1 above to determine the theoretical percentage by volume of carbon dioxide as indicated in block 12. The operator observes the fuel feed rate (block 14) which, in this specific example, is coal. It is understood, however, that other forms of fuel and a combination of forms may be employed.

The operator now employs the observed fuel feed rate, expressed in pounds per hour, and the theoretical carbon dioxide percentage, as determined in the step designated 12, and determines the calcining rate as indicated by block 16, which step is accomplished by inserting the values obtained in the steps of blocks 12 and 14 into Equation 2 above. The operator now observes the rate at which slurry is fed, and compares this feed rate with the calcining rate, which observation and comparison step is indicated by block 18. On the basis of this comparison, the operator controls one or more factors in kiln operation to compensate for any difference in the comparison, which step is indicated by block 20. In other words, if the slurry feed rate differs from the calcining rate, then the firing rate may be adjusted, the ratio of fuel to air adjusted, kiln speed changed, or rate of slurry feed changed. The amount of corrective action required is of course related to the extent of the deviation, or disparity.

Referring now to FIG. 2, there is depicted in block form one apparatus which may be employed to accomplish the novel method of this invention. As therein depicted, a kiln (not shown) as a group of gas analyzing devices 26, 28 and 30 mounted thereon, which devices may be mounted to detect the percentages of carbon dioxide, oxygen and carbon monoxide, respectively, in the waste gases passing through the kiln. These devices may be of any convenient form known in the art and they are preferably of the type which delivers an electrical analog signal indicative of the percentage of the respective gas. The output signals from the individual gas analyzers 26, 28 and 30 are connected to three of the four input terminals of an analog computer 31 which computes the amount of theoretical carbon dioxide by the use of Equation 1, above. The output signal generated by carbon dioxide analyzing device 26 is fed to one of the input terminals of an adder stage 32. The output of carbon monoxide analyzer 30 is fed to another input terminal of adder 32 and adder 32 adds the signals to give an output indicative of the sum of percentages of carbon dioxide and carbon monoxide, which output is fed to a multiplier stage 34, which multiplies the signal indicative of the added figure by a factor of 100. Thus, these two stages of the computer perform those mathematical functions set forth in the numerator of the right hand portion of Equation 1.

The output signal from oxygen analyzer 28 is fed to a constant multiplier stage 36, which multiplies the oxygen content indicating signal by a factor of 4.78 and the output signal of constant multiplier stage 36 is fed to a difference amplifier 40, which amplifier substracts the signal indicative of the multiplied output from stage 36 from a constant signal indicative of a value of 100. The output of carbon monoxide analyzer 30 is also fed to a constant multiplier stage 42 which multiplies the output signal from signal source 30 by a factor of 1.88. The signals from difference amplifier stage 40 and multiplier stage 42 are fed to an adder stage 44 which adds these two signals. The output signal from adder stage 44 corresponds to the factor represented by the denominator of the right hand portion of Equation 1. The only step of Equation 1 which remains to determine the theoretical carbon dioxide content is to divide the signal indicative of the numerator of the right hand portion by the signal indicative of the denominator of the right hand portion. These two signals are fed to a divider stage 46 which performs the required step. The output of divider stage 46 is therefore a signal representative of the theoretical carbon dioxide content of the waste gas in the kiln, which theoretical content can be expressed as a percentage by volume, and will be designated by the letter C.

It is this theoretical percentage of carbon dioxide, C which is employed in Equation 2 to determine the calcining rate. The theoretical carbon dioxide content C appears in both the numerator and denominator of Equation 2. In the numerator, a constant term $p$ is subtracted from C while, in the denominator, C is substracted from a constant, 100. Accordingly, the signals indicative of the term C, which are fed from divider 46, are fed to a pair of difference amplifiers 48, 50. In difference amplifier 48, the signal indicative of constant term $p$, which for example is 18.5% for bituminous coal, is subtracted from the signal indicative of C and the output is fed to a multiplier stage 52, which multiplies the difference signal by a constant factor $t$, which is for example 130.4 for a typical coal at 60° F., 14.65 p.s.i.a. Therefore, the output signal from multiplier stage 52 represents the numerator of the fraction of the right hand portion of Equation 2. The difference signal from amplifier stage 50 is fed to a multiplier stage 54, which multiplier multiplies the difference signal from amplifier stage 50 by a constant factor $m$, which is 16.98 at 60° F., 14.65 p.s.i.a. for $CaCO_3$, $MgCO_3$. Thus the output of multiplier stage 54 is a signal indicative of the denominator of the fraction in the right hand portion of Equation 2. The output signals of multiplier stages 52, 54 are fed to the inputs of a divider stage 56 such that the divider accomplishes the function of dividing the signal indicative of the numerator of the fraction by the denominator of the fraction of Equation 2. The output signal of divider stage 56 is fed to a multiplier 58, which multiplier has a computer input terminal which receives an electrical signal from a fuel feed rate indicator 60 which generates an analog signal which corresponds to the term F in Equation 2. Thus multiplier stage 58 accomplishes the function of multiplying the signal indicative of the term F with the fractional portion of Equation 2 to deliver an output signal indicative of the calcining rate.

This calcining rate indicating signal is fed to a calcining rate indicator 62, which calcining rate indicator also receives a signal from a slurry feed rate signal generator 64. Thus the calcining rate indicator can be of the comparison type known as a deviation recorder which compares the rate at which the material in the kiln is being calcined with the rate at which slurry is being fed into the kiln. Any indicated deviation, or disparity indicates an abnormality in the calcining process and indcates that the firing rate or kiln speed, o rother factor in kiln operation must be adjusted to compensate for this deviation. For example, if the calcining rate is greater than the feed rate, then the firing rate usually should be decreased. If, however, the feed rate is greater than the calcining rate, then the firing rate is usually increased. A circuit for adjusting factors in kiln operation such as firing rate, kiln speed and slurry feed are indicated by blocks 66, 67 and 65 respectively, which blocks receive signals from the deviation recorder 62.

Advantageously, the circuits of this analog computer may be in accordance with the circuits shown and described in chapter 8 of the text entitled, "Electron Tube Circuits," by Samuel Seely, a McGraw Hill publication, first edition, 1950. More specifically, the adder circuits 32, 44 may be of the type shown in Fig. 8–6 on page 148 of this text. Divider circuits 46, 56 may be in accordance with that represented in Fig. 8–15 on page 155 of this text. The multiplier stages 34, 36, 42, 52, 54 and 58 may be in accordance with those shown in Fig. 8–12 on page 153 of this text and difference amplifiers 40, 48 and 50 may be in accordance with that represented in Fig. 8–1 on page 146 of this text. In constant multiplier stages 34, 36, 42, 52 and 54, the signal indicative of the constant multiplier may be from a constant potential source. Advantageously difference amplifier 48, multiplier 52 and multiplier 54 are provided with manual adjustments, as shown, which may be set for the proper values of constants $p$, $t$ and $m$ respectively.

It is, of course, understood that other forms of circuits may be employed for performing these respective mathematical functions and it is also possible to employ single stages which correspond to two or more of the stages in the computer. For example, a single stage may perform the function of adding two signals together and multiplying the added signals by a constant multiplier and thus stages 32, 34, which are shown inclosed in a dotted outline block 68, may be combined into a single stage. Similarly, constant multiplier stage 36 may be combined with difference amplifier stage 40 into a single stage as indicated by dotted outline block 70. The constant multiplier stage 42 may be combined with adder stage 44 into a single stage indicated at 72. The difference amplifier 48 may be combined with multiplier 52 into a stage 74, and the difference amplifier 50 may be combined with multiplier 50 in a stage 76.

The automatic firing rate control may take any one of the several forms well known in the art. The slurry feed rate indicator 64 and the fuel feed rate indicator 69 may be tachometer type generators, for example, in which the output signal is proportional to the speed of rotation. In the instance of the fuel feed rate, where a solid fuel is used, the tachometer generator could be driven by a vane rotated in accordance with the rate of coal feed to the kiln. With a liquid or gas fuel a suitable metering device could be employed actuating a signal generator such as a movable core transformer provided with a demodulator.

With respect to the precision of this system of kiln control outlined above, it is to be noted that the calculated calcining rate is directly proportional to the rate of fuel supply and therefore a certain error in the determination of the fuel supply will cause a corresponding error in the calculated calcining rate. With regard to gas analysis by the analyzers 26, 28, 30, a one percent error in the carbon dioxide analyzer 26 will result in an error of 9.4% in the calculated calcining rate. A one percent error in the oxygen analyzer 28 will cause an error in calcining rate of 15.7%, and an error of one percent in the carbon monoxide analyzer 30 will cause an error in calcining rate of 3.8%. The error in calcining rate caused by an error in carbon monoxide analysis is relatively small. Because a kiln is seldom allowed to operate under reducing conditions, i.e., generating carbon monoxide, the error in the value of carbon monoxide will seldom have any effect. If, however, such an error occurs, its effect will be small. Because the errors in carbon dioxide and oxygen have a noticeable effect, it is important that analyzers 26, 28 have a high degree of accuracy, and preferably a higher degree of accuracy than carbon monoxide analyzer 30.

While I have shown and described one illustrative embodiment of method and apparatus for controlling the operation of a cement kiln, it is understood that the concepts thereof may be applied to other embodiments without departing from the spirit and scope of this invention. For example, although the steps of the method shown graphically in FIG. 1 are indicated in a predetermined sequence, it is not essential that they be performed in this sequence. All observations, or the steps indicated by blocks 10, 14 and 18, may be performed at the same time while the determination of the theoretical carbon dioxide percentage indicated by block 12 must logically follow the steps of observation and the determination of the calcining rate, as indicated by block 16, must logically follow the step of determining theoretical carbon dioxide, as indicated by block 12. Similarly, while the apparatus of FIG. 2 was described as employing an analog computer, the concept is not so restricted, as it is apparent that a digital computer might equally as well be employed.

Furthermore while I have illustrated and described my invention as applied to a cement kiln, it is not to be construed as limited thereto for it is applicable to other processes wherein a material is calcined. For example, in the production of lime wherein limestone is burned in a kiln to produce calcium oxide, the calcining rate may be determined and employed in the operation of the kiln in accordance with the teachings of my invention.

What I claim is:

1. In an apparatus for kiln control, the combination comprising first signal source means coupled to said kiln for delivering an output signal indicative of the percentage of carbon dioxide in the waste gases from said kiln, second signal source means coupled to said kiln for generating an output signal indicative of the percentage of oxygen in the waste gases from said kiln, third signal source means coupled to said kiln for generating an output signal indicative of the percentage of carbon monoxide in the waste gases from said kiln, computer means including means for combining said signals into a single signal indicative of the theoretical $CO_2$ percent by volume in accordance with the following equation:

$$C = \frac{100 \ (CO_2 + CO)}{100 - 4.78 \ O_2 + 1.88 \ CO}$$

where C is the theoretical $CO_2$, $CO_2$ is the percentage by volume of carbon dioxide, CO is the percentage by volume of carbon monoxide and $O_2$ is the percentage by volume of oxygen, fuel feed means coupled to said kiln for delivering an output signal indicative of the fuel feed rate, said computer means including means for combining said fuel feed rate signal with the said single signal and means coupled to said last-mentioned means for indicating the calcining rate within said kiln.

2. A system for controlling a kiln in accordance with the calcining rate within the kiln comprising first signal generating means for generating a first signal indicative of the percentage of carbon dioxide within said kiln, second signal generating means for generating a second signal indicative of the oxygen content within said kiln, third signal generating means for generating a signal indicative of the percentage of carbon monoxide within said kiln, computer means connected to said signal generating means and fuel feed rate means coupled to said computer means for generating a signal indicative of the rate at which fuel is fed to said kiln, said computer means delivering an output signal indicative of the calcining rate.

3. The apparatus according to claim 2 further comprising means for indicating the rate at which slurry is fed to said kiln and deviation recorder means coupled to the output of said computer means and said slurry indicating means for indicating the deviation of the calcining rate from the slurry feed rate.

4. The combination according to claim 3 further comprising firing control means controlled by said last named means.

5. An apparatus for controlling a cement kiln comprising gas analyzer means operatively associated with the kiln to analyze the waste gases of the kiln and indicate in these waste gases the percentages by volume of carbon dioxide, oxygen and carbon monoxide; means for measuring the fuel feed rate; means for combining these percentages and this rate to determine the calcining rate; means for measuring the slurry feed rate, and comparison means for comparing the slurry feed rate with the calcining rate.

6. The combination according to claim 5 further comprising automatic firing rate control means coupled to said comparison means and controlled in accordance with the disparity between the calcining rate and the slurry feed rate.

7. In an apparatus for kiln control, the combination comprising signal generating means for analyzing the waste gases of the kiln to determine the percentages, by volume, of carbon dioxide, oxygen and carbon monoxide and generating analog signals proportional to these percentages, first adder means for adding signals indicative of the percentages of carbon dioxide and carbon monoxide, and delivering a first sum output signal, first multiplier means for multiplying the first sum output signal by a constant multiplier, second multiplier means for multiplying a signal indicative of the percentage of oxygen by a constant multiplier, first difference amplifier means for subtracting the output signal of said second multiplier means from a contant factor, third multiplier means for multiplying a signal indicative of the percentage of carbon monoxide by a constant multiplier, second adder means for adding the output of said first difference amplifier means and said third multiplier means and divider means for dividing the output of said second adder means into the output of said first multiplier means.

8. The combination according to claim 7 further comprising a third and a fourth difference amplifier means, each having an input connected to the output of said divider means, said third difference amplifier means subtracting a constant factor from the output signal of said divider means, said fourth difference amplifier means subtracting the output signal of said divider means from a constant factor, fourth multiplier means connected to the output of said third difference amplifier means for multiplying the output of said third difference amplifier by a contant factor, fifth multiplier means for multiplying the output of said fourth difference amplifier means by a constant factor, second divider means coupled to the output of said fourth and fifth multiplier means, sixth multiplier means coupled to the output of said second divider means, fuel feed rate signal generating means coupled to said sixth multiplier means and first indicating means coupled to said sixth multiplier means for indicating the calcining rate of said kiln.

9. The combination according to claim 8 further comprising slurry feed rate indicating means coupled to said first indicating means.

10. The combination according to claim 9 wherein said first indicating means compares said calcining rate and said slurry feed rate.

11. The combination according to claim 10 further comprising kiln control means coupled to said first indicating means and actuated in accordance with the disparity between calcining rate and the slurry feed rate.

12. The combination according to claim 11 wherein said kiln control means includes firing rate control means.

13. The combination according to claim 11 wherein said kiln control means includes kiln speed control means.

14. The combination according to claim 11 wherein said kiln control means includes slurry feed rate control means.

15. A meter for exhibiting the rate at which a calcareous material is changed from a carbonate to an oxide in a kiln through the application of heat generated by the combustion of a fuel with air in the kiln, comprising in combination, first means generating a first signal indicative of the percentage of carbon dioxide within the kiln, second means generating a second signal indicative of the oxygen content within the kiln, third means generating a third signal indicative of the rate at which fuel is fed to the kiln and computer means responsive to said first, second and third signals delivering an output signal indicative of the rate at which the calcareous material is changed from a carbonate to an oxide.

16. The method of operating a kiln into which a calcareous material is fed and chemically changed from a carbonate to an oxide through the application of heat generated by the combustion of a fuel with air in the kiln comprising the steps of analyzing the waste gases in the kiln, generating a signal from said waste gas analysis proportional to the theoretical carbon dioxide of the waste gas, generating a signal proportional to the fuel rate to said kiln, combining the waste gas signal with the fuel rate signal thereby developing a signal corresponding to the rate of chemical change, generating a signal proportional to the slurry feed rate to said kiln, and adjusting kiln operation in a direction tending to maintain a predetermined relationship between the rate of chemical change signal and the signal proportional to the slurry feed rate.

17. The combination according to claim 15 further comprising means for varying the application of heat in the kiln controlled by said output signal.

18. The combination according to claim 15 further comprising means for varying the rate of rotation of said kiln under the control of said output signal.

19. The combination according to claim 15 further comprising means for varying the rate at which the calcareous material is fed into said kiln under the control of said output signal.

20. The method of operating a kiln into which a calcareous material is fed and chemically changed from a carbonate to an oxide through the application of heat generated by the combustion of a fuel with air in the kiln comprising the steps of analyzing the waste gases in the kiln, generating a signal from said waste gas analysis proportional to the theoretical carbon dioxide of the waste gas, generating a signal proportional to the fuel rate to said kiln, combining the waste gas signal with the fuel rate signal thereby developing a signal corresponding to the rate of chemical change and adjusting kiln operation in a direction tending to maintain said last named signal at a predetermined value.

21. The method according to claim 20 which includes the step of adjusting kiln operation by varying the application of heat in a direction tending to maintain said last named signal at a predetermined value.

22. The method according to claim 20 which includes the step of adjusting kiln operation by varying kiln speed in a direction tending to maintain said last named signal at a predetermind value.

23. The method according to claim 20 which includes the step of adjusting kiln opeartion by varying the rate at which the calcareous material is fed into the kiln in a direction tending to tnaintain said last named signal at a predetermined value.

References Cited by the Examiner
UNITED STATES PATENTS 2,298,257 10/1942 Reaser et al. _____ 236—15
3,153,587 10/1964 Schuerger _____ 236—15

OTHER REFERENCES

J. F. Sandelien: Pages 35 and 36 of IBM Technical Disclosure Bulletin, volume 6, No. 5, October 1963.

FREDERICK L. MATTESON, JR., *Primary Examiner.*

JOHN J. CAMBY, *Examiner.*